(12) United States Patent
Tang

(10) Patent No.: US 11,234,284 B2
(45) Date of Patent: Jan. 25, 2022

(54) METHOD AND APPARATUS FOR ESTABLISHING SECONDARY CONNECTION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/039,855

(22) Filed: Sep. 30, 2020

(65) Prior Publication Data

US 2021/0022195 A1 Jan. 21, 2021

Related U.S. Application Data

(60) Division of application No. 16/211,008, filed on Dec. 5, 2018, now Pat. No. 10,834,770, which is a
(Continued)

(51) Int. Cl.
*H04W 76/15* (2018.01)
*H04W 28/08* (2009.01)
(Continued)

(52) U.S. Cl.
CPC ............ *H04W 76/15* (2018.02); *H04L 41/08* (2013.01); *H04W 28/08* (2013.01);
(Continued)

(58) Field of Classification Search
CPC . H04L 41/08; H04L 29/06088; H04L 5/0035; H04L 67/125; H04L 47/125;
(Continued)

(56) References Cited

U.S. PATENT DOCUMENTS 8,639,625 B1 1/2014 Ginter et al.
9,210,266 B2 12/2015 Lum et al.
(Continued)

FOREIGN PATENT DOCUMENTS

CN 102843723 A 12/2012
CN 102932923 A 2/2013
(Continued)

OTHER PUBLICATIONS

International Search Report(ISR) dated Apr. 24, 2017 for Application No. PCT/CN2016/092360.
(Continued)

*Primary Examiner* — Mewale A Ambaye
(74) *Attorney, Agent, or Firm* — Ladas & Parry, LLP

(57) ABSTRACT

Provided are a method and an apparatus for establishing a secondary connection. The method includes: acquiring secondary network access capability information of a terminal device, where the secondary network access capability information is used to indicate a capability for the terminal device to access a secondary access network device; sending a secondary connection addition request message to a first secondary access network device, where the secondary connection addition request message is used to request addition of the first secondary access network device as a network device for transmitting data, and includes the secondary network access capability information; and receiving a confirmation message of the secondary connection addition request message sent by the first secondary access network device, where the confirmation message of the secondary connection addition request message includes first configuration information used to establish the secondary connection between the first secondary access network device and the terminal device.

16 Claims, 6 Drawing Sheets

Related U.S. Application Data continuation of application No. PCT/CN2016/092360, filed on Jul. 29, 2016.

(51) Int. Cl.
*H04W 36/00* (2009.01)
*H04L 12/24* (2006.01)
*H04W 72/08* (2009.01)
*H04W 8/18* (2009.01)
*H04W 88/06* (2009.01)

(52) U.S. Cl.
CPC ..... *H04W 36/0069* (2018.08); *H04W 72/085* (2013.01); *H04W 8/18* (2013.01); *H04W 88/06* (2013.01)

(58) Field of Classification Search
CPC . H04W 76/15; H04W 36/0069; H04W 28/08; H04W 72/085; H04W 8/18; H04W 88/06; H04B 1/406
See application file for complete search history.

(56) References Cited

U.S. PATENT DOCUMENTS

| | | | |
|---|---|---|---|
| 2004/0008654 A1 | 1/2004 | Klein et al. | |
| 2013/0021929 A1* | 1/2013 | Kim | H04W 72/042 370/252 |
| 2014/0098671 A1 | 4/2014 | Raleigh et al. | |
| 2014/0177507 A1 | 6/2014 | Hsu | |
| 2015/0245403 A1* | 8/2015 | Futaki | H04B 7/024 370/329 |
| 2016/0150502 A1 | 5/2016 | Sebire et al. | |
| 2016/0212790 A1 | 7/2016 | Fujishiro et al. | |
| 2017/0013650 A1 | 1/2017 | Fujishiro et al. | |
| 2017/0064585 A1 | 3/2017 | Kim et al. | |
| 2017/0188275 A1 | 6/2017 | Kim et al. | |
| 2018/0098373 A1 | 4/2018 | Kawasaki et al. | |
| 2018/0103502 A1* | 4/2018 | Kawasaki | H04W 76/10 |
| 2019/0053120 A1* | 2/2019 | Park | H04W 76/27 |
| 2019/0079557 A1 | 3/2019 | Jung et al. | |
| 2019/0174363 A1 | 6/2019 | Tsuda et al. | |
| 2020/0275279 A1* | 8/2020 | Tangudu | H04L 63/1458 |
| 2020/0314701 A1* | 10/2020 | Talebi Fard | H04W 36/0033 |
| 2020/0314731 A1* | 10/2020 | Ryu | H04W 48/12 |
| 2021/0243590 A1* | 8/2021 | Jin | H04W 8/22 |

FOREIGN PATENT DOCUMENTS

| | | | |
|---|---|---|---|
| CN | 104105221 A | 10/2014 | |
| CN | 104349419 A | 2/2015 | |
| CN | 104378842 A | 2/2015 | |
| CN | 105517043 A | 4/2016 | |
| CN | 105637967 A | 6/2016 | |
| CN | 107666727 A | 2/2018 | |
| EP | 3188568 A1 | 7/2017 | |
| IN | 3531DEL2014 A | 6/2016 | |
| JP | 2016077013 A | 5/2016 | |
| WO | 2015098951 A1 | 7/2015 | |
| WO | 2015115458 A1 | 8/2015 | |
| WO | 2016045306 A1 | 3/2016 | |

OTHER PUBLICATIONS

The Extended Search Report of corresponding Europe application No. 16910201.9, dated May 2, 2019.
The First Office Action of corresponding Chinese application No. 201680087353.7 dated Jun. 3, 2020.
The First Office Action of corresponding Europe application No. 16910201.9, dated Mar. 31, 2020.
The First Office Action of corresponding India application No. 201817047941, dated Jul. 3, 2020.
The First Office Action of corresponding Japanese application No. 2019-500405, dated Jul. 2020.
The Non-final Rejection of corresponding American U.S. Appl. No. 16/211,008, dated Jan. 22, 2020.
The Final Rejection of corresponding American U.S. Appl. No. 16/211,008, dated May 5, 2020.
The Notice of Allowance of corresponding American U.S. Appl. No. 16/211,008, dated Jul. 10, 2020.
Written Opinion of the International Searching Authority dated Apr. 24, 2017 for Application No. PCT/CN2016/092360.
International Preliminary Report on Patentability dated Jan. 29, 2019 for Application No. PCT/CN2016/092360.
The second Office Action of corresponding Chinese application No. 201680087353.7, dated Oct. 30, 2020.
The first Office Action of corresponding Taiwan application No. 106123098 dated Oct. 30, 2020.
The Oral Proceedings of corresponding European application No. 16910201.9, dated Oct. 27, 2020.
3GPP TS 36.331 V13.0.0, 3rd Generation Partnership Project;Technical Specification Group Radio Access Network; Evolved Universal Terrestrial Radio Access (E-UTRA); Radio Resource Control (RRC);Protocol specification(Release 13).
3GPP TS 36.423 V13.2.0, 3rd Generation Partnership Project;Technical Specification Group Radio Access Network; Evolved Universal Terrestrial Radio Access Network(E-UTRAN);X2 application protocol (X2AP)(Release 13).
The EESR of corresponding European application No. 21189840.8, dated Oct. 15, 2021.

* cited by examiner

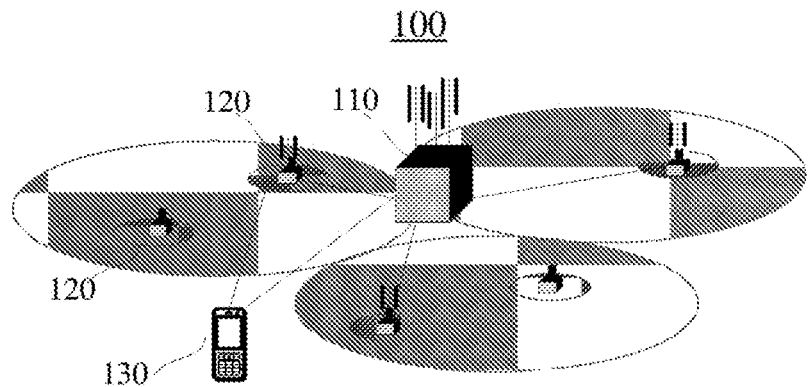

A primary access network device acquires secondary network access capability information of a terminal device, where the secondary network access capability information is used to indicate a capability for the terminal device to access a secondary access network device ~S210

Sending a secondary connection addition request message to a first secondary access network device, where the secondary connection addition request message is used to request addition of the first secondary access network device as a network device for transmitting data, and the secondary connection addition request message includes the secondary network access capability information ~S220

Receiving a confirmation message of the secondary connection addition request message sent by the first secondary access network device, where the confirmation message of the secondary connection addition request message includes first configuration information, and the first configuration information is used to establish the secondary connection between the first secondary access network device and the terminal device ~S230

S310 — A first secondary access network device receives a secondary connection addition request message sent by a primary access network device, where the secondary connection addition request message is used to request addition of the first secondary access network device as a network device for transmitting data, and the secondary connection addition request message includes secondary network access capability information, where the secondary network access capability information is used to indicate a capability for the terminal device to access a secondary access network device S320 — The first secondary access network device generates first configuration information according to the secondary network access capability information, where the first configuration information is used to establish the secondary connection between the first secondary access network device and the terminal device S330 — The first secondary access network device sends a confirmation message of the secondary connection addition request message to the primary access network device, where the confirmation message of the secondary connection addition request message includes the first configuration information

S410 — A terminal device sends secondary network access capability information of the terminal device to a primary access network device, where the secondary network access capability information is used to indicate a capability for the terminal device to access a secondary access network device S420 — The terminal device receives first configuration information sent by the primary access network device, where the first configuration information is used to establish the secondary connection between the first secondary access network device and the terminal device

FIG. 4

METHOD AND APPARATUS FOR ESTABLISHING SECONDARY CONNECTION

CROSS-REFERENCE TO RELATED APPLICATION

This application is a divisional application of U.S. patent application Ser. No. 16/211,008, filed on Dec. 5, 2018, which is a continuation of International Application No. PCT/CN2016/092360, filed on Jul. 29, 2016, the disclosures of which are hereby incorporated by reference in their entireties.

TECHNICAL FIELD

The present disclosure relates to the field of communications and, in particular, to a method and an apparatus for establishing a secondary connection.

BACKGROUND

With the rapid development of the Mobile Internet, mobile traffic grows explosively. In response to the traffic pressure, the deployment of network devices has become more and more intensive, and the heterogeneous deployment of a macro base station and a small base station has become more widespread. In order to enable user equipment to simultaneously use resources of the macro base station and the small base station, a dual (multiple) connection technology emerges as the times require, which realizes data aggregation between the macro base station and the small base station.

There is one primary connection and one or more secondary connections in a multiple (dual) connection of the terminal device. The primary connection is a network connection between the terminal device and a primary access network device, and the secondary connection is a network connection between the terminal device and a secondary access network device. Data in a control plane of the terminal device is transmitted through the primary connection, and data in a user plane of the terminal device may be divided into two routes to be simultaneously transmitted through the two connections to improve data throughput in the user plane; or the user data is transmitted by the secondary access network device to reduce a load of the primary access network. Therefore, there is a need for a method for establishing a secondary connection to increase the data throughput in the user plane and reduce the load of the primary access network device.

SUMMARY

Embodiments of the present disclosure provide a method and an apparatus for establishing a secondary connection, which can improve data throughput in a user plane and reduce a load of a primary access network device.

In a first aspect, a method for establishing a secondary connection is provided, including: acquiring, by a primary access network device, secondary network access capability information of a terminal device, where the secondary network access capability information is used to indicate a capability for the terminal device to access a secondary access network device; sending, by the primary access network device, a secondary connection addition request message to a first secondary access network device, where the secondary connection addition request message is used to request addition of the first secondary access network device as a network device for transmitting data, and the secondary connection addition request message includes the secondary network access capability information; and receiving, by the primary access network device, a confirmation message of the secondary connection addition request message sent by the first secondary access network device, where the confirmation message of the secondary connection addition request message includes first configuration information, and the first configuration information is used to establish the secondary connection between the first secondary access network device and the terminal device.

By reporting capability information for a terminal device to access a secondary access network device to a first secondary access network device, the first secondary access network device can configure the terminal device with reference to the capability information, so that the terminal device may establish a secondary connection with the first secondary access network device, which can improve data throughput in a user plane and reduce a load of a primary access network device.

In conjunction with the first aspect, in a first possible implementation of the first aspect, the secondary connection addition request message further includes second configuration information, where the second configuration information is configuration information of the secondary connection that has been established by the terminal device.

By sending configuration information of the secondary connection that has been established by the terminal device to the first secondary access network device, the first secondary access network device can configure the terminal device with reference to both the secondary network access capability information and the second configuration information, so that the terminal device may establish the secondary connection with the first secondary access network device.

In conjunction with an above-described possible implementation of the first aspect, in a second possible implementation of the first aspect, the acquiring, by the primary access network device, the secondary network access capability information of the terminal device includes: receiving, by the primary access network device, a first message sent by the terminal device or a core network device, where the first message includes the secondary network access capability information; and acquiring, by the primary access network device, the secondary network access capability information from the first message.

In an embodiment of the present disclosure, when performing an attach process, the terminal device sends the secondary network access capability information of the terminal device to a core network device, so that the core network device may forward the secondary network access capability information to the primary access network device.

In conjunction with an above-described possible implementation of the first aspect, in a third possible implementation of the first aspect, the receiving, by the primary access network device, the first message sent by the terminal device includes: receiving, by the primary access network device, the first message sent by the terminal device, where the first message is used to indicate that a configuration between the terminal device and the first secondary access network device is valid.

In conjunction with an above-described possible implementation of the first aspect, in a fourth possible implementation of the first aspect, the secondary network access capability information is used to indicate the maximum capability for the terminal device to access the secondary access network device, or the secondary network access capability information is used to indicate a capability for the terminal device to access a to-be-added secondary access network device, where the to-be-added secondary access network device includes the first secondary access network device.

In an embodiment of the present disclosure, the secondary network access capability information may be all capability information for the terminal device to access the secondary access network device, or may be access network capability information that may be used by the terminal device in all secondary network connections, or may be access network capability information that can be used by the terminal device in a next secondary network configuration.

In conjunction with an above-described possible implementation of the first aspect, in a fifth possible implementation of the first aspect, before the sending, by the primary access network device, the secondary connection addition request message to the first secondary access network device, including: receiving, by the primary access network device, measurement result information of at least one secondary access network device sent by the terminal device, where the measurement result information is used to indicate a link quality between a respective secondary access network device and the terminal device; and determining, by the primary access network device, the first secondary access network device according to measurement result information of each of the at least one secondary access network device.

In conjunction with an above-described possible implementation of the first aspect, in a sixth possible implementation of the first aspect, the method further includes: sending, by the primary access network device, the first configuration information to the terminal device so that the terminal device establishes the secondary connection with the first secondary access network device according to the first configuration information.

In conjunction with an above-described possible implementation of the first aspect, in a seventh possible implementation of the first aspect, the primary access network device is a network device in a first communication system, and the secondary access network device is a network device in a second communication system.

Establishment of a secondary connection in two systems is supported so that the method for establishing the secondary connection is more flexible.

Preferably, the first communication system is a Long Term Evolution (LTE) system, and the second communication system is a New Radio (NR) system.

In a second aspect, a method for establishing a secondary connection is provided, including: receiving, by a first secondary access network device, a secondary connection addition request message sent by a primary access network device, where the secondary connection addition request message is used to request addition of the first secondary access network device as a network device for transmitting data, and the secondary connection addition request message includes secondary network access capability information, where the secondary network access capability information is used to indicate a capability for the terminal device to access a secondary access network device; generating, by the first secondary access network device, first configuration information according to the secondary network access capability information, where the first configuration information is used to establish the secondary connection between the first secondary access network device and the terminal device; and sending, by the first secondary access network device, a confirmation message of the secondary connection addition request message to the primary access network device, where the confirmation message of the secondary connection addition request message includes the first configuration information.

By reporting capability information for a terminal device to access a secondary access network device to a first secondary access network device, the first secondary access network device can configure the terminal device with reference to the capability information, so that the terminal device may establish a secondary connection with the first secondary access network device, which can improve data throughput in a user plane and reduce a load of a primary access network device.

In conjunction with the second aspect, in a first possible implementation of the second aspect, the secondary network access capability information is used to indicate the maximum capability for the terminal device to access the secondary access network device, the secondary connection addition request message further includes second configuration information which is configuration information of a secondary connection that has been established by the terminal device, and the generating, by the first secondary access network device, the first configuration information according to the secondary network access capability information includes: generating, by the first secondary access network device, the first configuration information according to the secondary network access capability information and the second configuration information, where a sum of configurations corresponding to the first configuration information and the second configuration information does not exceed the capability for the terminal device to access the secondary access network device indicated by the secondary network access capability information.

In an embodiment of the present disclosure, the first secondary access network device needs to ensure that a configuration of all secondary connections does not exceed the secondary network access capability information of the terminal device involved in the first possible implementation.

In conjunction with an above-described possible implementation of the second aspect, in a second possible implementation of the second aspect, the secondary network access capability information is used to indicate a capability for the terminal device to access a to-be-added secondary access network device, where the to-be-added secondary access network device includes the first secondary access network device.

In an embodiment of the present disclosure, the first secondary access network device needs to ensure that a configuration of all secondary connections does not exceed the secondary network access capability information of the terminal device involved in the second possible implementation.

In a third aspect, a method for establishing a secondary connection is provided, including: sending, by a terminal device, secondary network access capability information of the terminal device to a primary access network device, where the secondary network access capability information is used to indicate a capability for the terminal device to access a secondary access network device; and receiving, by the terminal device, first configuration information sent by the primary access network device, where the first configuration information is used to establish the secondary connection between the first secondary access network device and the terminal device.

By reporting capability information for a terminal device to access a secondary access network device to a first secondary access network device, the first secondary access network device can configure the terminal device with reference to the capability information, so that the terminal device may establish a secondary connection with the first secondary access network device, which can improve data throughput in a user plane and reduce a load of a primary access network device.

In conjunction with the third aspect, in a first possible implementation of the third aspect, the sending, by the terminal device, the secondary network access capability information of the terminal device to the primary access network device includes: sending, by the terminal device, a first message to the primary access network device, where the first message is used to indicate that a configuration between the terminal device and the first secondary access network device is valid, and the first message includes the secondary network access capability information.

In conjunction with an above-described possible implementation of the third aspect, in a second possible implementation of the third aspect, the secondary network access capability information is used to indicate the maximum capability for the terminal device to access the secondary access network device, or the secondary network access capability information is used to indicate a capability for the terminal device to access a to-be-added secondary access network device, where the to-be-added secondary access network device includes the first secondary access network device.

In conjunction with an above-described possible implementation of the third aspect, in a third possible implementation of the third aspect, the method further includes: establishing, by the terminal device, the secondary connection with the first secondary access network device according to the first configuration information.

In a fourth aspect, an apparatus for establishing a secondary connection is provided, which is configured to perform the method in the first aspect or any possible implementation of the first aspect described above. In particular, the apparatus includes a unit for performing the method in the first aspect or any possible implementation of the first aspect described above.

In a fifth aspect, an apparatus for establishing a secondary connection is provided, which is configured to perform the method in the second aspect or any possible implementation of the second aspect described above. In particular, the apparatus includes a unit for performing the method in the second aspect or any possible implementation of the second aspect described above.

In a sixth aspect, an apparatus for establishing a secondary connection is provided, which is configured to perform the method in the third aspect or any possible implementation of the third aspect described above. In particular, the apparatus includes a unit for performing the method in the third aspect or any possible implementation of the third aspect described above.

In a seventh aspect, an apparatus for establishing a secondary connection is provided, including: a memory, a processor, an input/output interface, a communication interface and a bus system, where the memory, the processor, the input/output interface and the communication interface are connected via the bus system, the memory is used to store an instruction, the processor is used to execute the instruction stored in the memory, and when the instruction is executed, the processor performs the method in the first aspect through the communication interface, and controls the input/output interface to receive input data and information, and to output data such as operation results.

In an eighth aspect, an apparatus for establishing a secondary connection is provided, including: a memory, a processor, an input/output interface, a communication interface and a bus system, where the memory, the processor, the input/output interface and the communication interface are connected via the bus system, the memory is used to store an instruction, the processor is used to execute the instruction stored in the memory, and when the instruction is executed, the processor performs the method in the second aspect through the communication interface, and controls the input/output interface to receive input data and information, and to output data such as operation results.

In a ninth aspect, an apparatus for establishing a secondary connection is provided, including: a memory, a processor, an input/output interface, a communication interface and a bus system, where the memory, the processor, the input/output interface and the communication interface are connected via the bus system, the memory is used to store an instruction, the processor is used to execute the instruction stored in the memory, and when the instruction is executed, the processor performs the method in the third aspect through the communication interface, and controls the input/output interface to receive input data and information, and to output data such as operation results.

In a tenth aspect, a computer readable medium for storing a computer program is provided, where the computer program includes an instruction for performing the method in the first aspect or any possible implementation of the first aspect.

In an eleventh aspect, a computer readable medium for storing a computer program is provided, where the computer program includes an instruction for performing the method in the second aspect or any possible implementation of the second aspect.

In a twelfth aspect, a computer readable medium for storing a computer program is provided, where the computer program includes an instruction for performing the method in the third aspect or any possible implementation of the third aspect.

In the present disclosure, the terminal device, the primary access network device, the secondary access network device and the core network device are not limited to the devices themselves in terms of their names. In an actual implementation, these devices may appear under other names. As long as the functions of the devices are similar to those of the present disclosure, these devices fall into the scope of the claims of the present disclosure and equivalents thereof.

These and other aspects of the present disclosure will be more apparent from the following description of the embodiments.

BRIEF DESCRIPTION OF THE DRAWINGS

In order to more clearly illustrate technical solutions in the embodiments of the present disclosure, drawings used in the embodiments of the present disclosure will be briefly described below. It is obvious that the drawings described below are only some embodiments of the present disclosure. For those skilled in the art, other drawings may also be obtained based on these drawings without any creative effort.

FIG. 1 is a schematic diagram of an application scenario according to an embodiment of the present disclosure;

FIG. 2 is a schematic block diagram of a method for establishing a secondary connection according to an embodiment of the present disclosure;

FIG. 3 is another schematic block diagram of a method for establishing a secondary connection according to an embodiment of the present disclosure;

FIG. 4 is still another schematic block diagram of a method for establishing a secondary connection according to an embodiment of the present disclosure;

DESCRIPTION OF EMBODIMENTS

Figure 5:
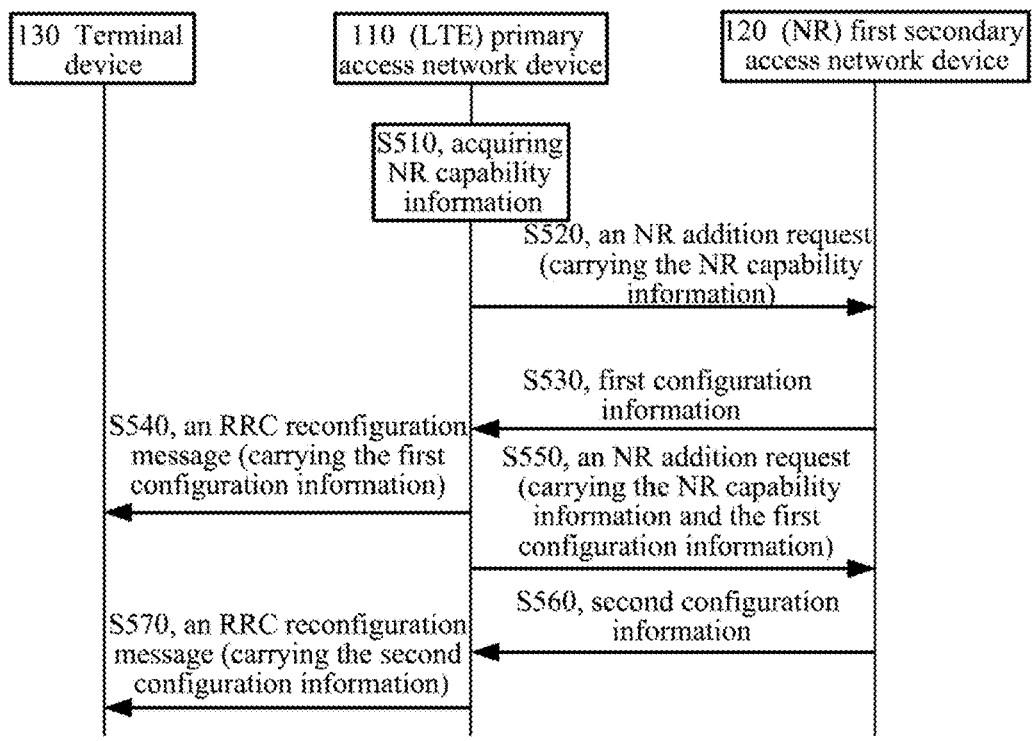
FIG. 5 is a schematic flow chart of a method for establishing a secondary connection according to an embodiment of the present disclosure.

The technical solutions in the embodiments of the present disclosure will be clearly and completely described below with reference to the accompanying drawings in the embodiments of the present disclosure. It is obvious that the described embodiments are a part of the embodiments of the present disclosure, but not all the embodiments. All other embodiments obtained by persons of ordinary skill in the art based on the embodiments of the present disclosure without any creative effort should fall into the protection scope of the present disclosure.

It should be understood that the technical solutions in the embodiments of the present disclosure can be applied to various communication systems, such as a global system of mobile communication (Global System of Mobile communication, "GSM" for short), a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short), a long term evolution (Long Term Evolution, "LTE" for short) system, an LTE frequency division duplex (Frequency Division Duplex, "FDD" for short) system, an LTE time division duplex (Time Division Duplex, "TDD" for short), a universal mobile telecommunication system (Universal Mobile Telecommunication System, "UMTS" for short), a worldwide interoperability for microwave access (Worldwide Interoperability for Microwave Access, "WiMAX" for short) communication system, communication systems that may appear in the future, and the like.

It should also be understood that, in the embodiments of the present disclosure, the terminal device may be referred to as user equipment (User Equipment, "UE" for short), a terminal device, a mobile station (Mobile Station, "MS" for short), a mobile terminal (Mobile Terminal), terminal devices in a future 5G network, or the like. The terminal device may communicate with one or more core networks via a radio access network (Radio Access Network, "RAN" for short). For example, the terminal may be a mobile phone (or referred to as a "cellular" phone), a computer with a mobile terminal, or the like. For example, the terminal may also be a portable, pocket, handheld, computer built-in or in-vehicle mobile device exchanging voice and/or data with the wireless access network.

A primary access network device and a secondary access network device may be used to communicate with the mobile device, and the access network device may be a base station (Base Transceiver Station, "BTS" for short) in the global system of mobile communication (GSM) or the code division multiple access (CDMA), or may be a base station (Node B, "NB" for short) in the wideband code division multiple access (WCDMA), or may be an evolved base station (Evolutionary Node B, "eNB" or "eNodeB" for short) in the LTE, or a relay station or an access point. Alternatively, the access network device may be any one of an in-vehicle device, a wearable device, and an access network device in a future 5G network.

The core network device may be a mobility management entity (Mobility Management Entity, "MME" for short), or may be a serving gateway (Serving Gateway, "S-GW" for short) or a packet data network gateway (PDN Gateway, "P-GW"), which is not limited in the present application.

A bearer is a basic unit for controlling, at a radio access network (RAN) side, a capacity, a delay, and a bit rate of a user service. A user may use multiple bearers to carry out different services.

In an embodiment of the present disclosure, the primary access network device may be, for example, a Macrocell, and the secondary access network device may be, for example, a Microcell, a Picocell, or a Femtocell, however, embodiments of the present disclosure are not limited thereto.

More specifically, the primary access network device may be an LTE network device, and the secondary access network device is an NR network device; it should be understood that the embodiments of the present disclosure are not limited thereto, the primary access network device may also be a GSM network device, a CDMA network device, etc., and the secondary access network device may also be a GSM network device, a CDMA network device, etc., which is not limited in the embodiments of the present disclosure.

FIG. 1 shows a schematic diagram of an application scenario according to the present disclosure. Networks around a terminal device includes a primary access network device 110 and at least one secondary access network device 120, where the primary access network device 110 may be an LTE network, and the secondary access network device 120 may be an NR network. The terminal device 130 may establish connections with both the primary access network device 110 and the secondary access network device 120. A connection established between the terminal device 130 and the primary access network device 110 is a primary connection, and a connection established between the terminal device 130 and the secondary access network device 120 is a secondary connection. Control plane data of the terminal device 130 may be transmitted through the primary connection, and user plane data of the terminal device may be transmitted through both the primary connection and the secondary connection or may be transmitted only through the secondary connection. In an embodiment of the present disclosure, the primary access network device 110 may select a secondary access network device 120 satisfying a preset condition to transmit the control plane data of the terminal device 130, and thus the load of the primary access network device 110 may be further reduced. For example, the preset condition may be that a link quality between the secondary access network device 120 and the terminal device 130 satisfies a data transmission condition.

In an embodiment of the present disclosure, the secondary access network device 120 may be flexibly deployed according to service requirements and user density, and its function is to assist the primary access network device 110 in data sharing, and the data may include the user plane data and the control plane data of the terminal device 130. The deployment of secondary access network devices 120 may be discontinuous and there may be a large area of overlap between adjacent secondary cells, which is not limited in the embodiment of the present disclosure.

It should be understood that the embodiment of the present disclosure will be described by taking an LTE+NR system as an example, but the present disclosure is not limited thereto. In addition, the terms "system" and "network" are often used interchangeably herein. The term "and/or" herein is merely an association relationship describing associated objects, and indicates that there may be three relationships. For example, A and/or B may indicate presence of A only, of both A and B, and of B only. In addition, the character "/" herein generally indicates an "or" relationship between contextual objects.

FIG. 2 shows a schematic block diagram of a method 200 for establishing a secondary connection according to an embodiment of the present disclosure. The method 200 includes:

S210, a primary access network device acquires secondary network access capability information of a terminal device, where the secondary network access capability information is used to indicate a capability for the terminal device to access a secondary access network device;

S220, sending a secondary connection addition request message to a first secondary access network device, where the secondary connection addition request message is used to request addition of the first secondary access network device as a network device for transmitting data, and the secondary connection addition request message includes the secondary network access capability information; and S230, receiving a confirmation message of the secondary connection addition request message sent by the first secondary access network device, where the confirmation message of the secondary connection addition request message includes first configuration information, and the first configuration information is used to establish the secondary connection between the first secondary access network device and the terminal device.

It should be understood that the secondary network access capability information may be all capability information for the terminal device to connect to the secondary access network device, or may be access network capability information that may be used by the terminal device in all secondary network connections, or may be access network capability information that can be used by the terminal device to connect to a to-be-added access network device, which is not limited in the embodiment of the present disclosure as long as the secondary network access capability information includes the capability information for the terminal device to connect to the above first secondary access network device, such as carrier aggregation capability, a maximum number of data blocks that can be scheduled at a time, and so on. For example, in an LTE communication system, the terminal device supports a maximum of 32 carrier aggregations, and the carrier aggregation capability included in the secondary network access capability information that may be sent by the terminal device to the primary access network device may be 32, or may be 5 allocated by the terminal according to the service situation. In conclusion, a secondary connection capability corresponding to configuration information for the terminal device to access multiple secondary connections is not greater than the maximum capability for the terminal device to access the secondary network connections that is indicated in the secondary network access capability information.

When the terminal device is in an idle state, the secondary access network device around the primary access network device may be measured. Optionally, a measurement on the secondary access network device by the terminal device may be made according to a network protocol regulation, or may be made according to a configuration of the primary access network device, for example, the protocol specifies or the primary access network device configures that the secondary access network device around the primary access network device is measured within a certain interval period. Optionally, the terminal device may measure the secondary access network device according to the network's configuration information in the received system message, which is not limited in the embodiment of the present disclosure. At this time, the terminal device may first determine a secondary access network device to be added. For example, the terminal device determines to add the first secondary access network device as a network device for transmitting data, the terminal device allocates a part of capability to the first secondary access network device according to the maximum capability to access the secondary access network device and informs the primary access network device that the allocated capability and identification information of the first secondary access network device are carried in a notification message, so that the primary access network device sends the allocated capability to the first secondary access network device.

It should also be understood that the secondary connection is used to transmit data including first control plane data and/or user plane data.

Specifically, the primary access network device may acquire secondary network access capability information of the terminal device from the terminal device or a core network device, and send the secondary network access capability information to the first secondary access network device, so that the first secondary access network device may generate configuration information for establishing a secondary connection between the first secondary access network device and the terminal device with reference to the secondary network access capability information. After receiving the configuration information, the primary access network device forwards the configuration information to the terminal device to establish the secondary connection between the first secondary access network device and the terminal device.

Therefore, the embodiment of the present disclosure provides a new method for establishing a secondary connection, which is simple and flexible, thereby improving the data throughput in the user plane and reducing the load of the primary access network device.

In an embodiment of the present disclosure, the terminal device may send the secondary network access capability information to the primary access network device in a process of accessing the primary access network device. The process for the terminal device to access the primary access network device may be a process for the terminal device to access a first primary access network device when the terminal device needs to transmit data in an idle state; or it may be a process where a network device serving the terminal device needs to switch from a second primary access network device to the first primary access network device when the terminal device is in a data connection state, with regard to the case that the process for the terminal device to access the first primary access network device is specifically which step of the accessing process, it is not limited in the embodiment of the present disclosure. The terminal device may also have been connected to the primary access network device, that is, the terminal has established a bearer with the primary access network device.

Further, the secondary connection is used to transmit data, and the data includes user plane data and control plane data. The first secondary access network device may transmit the user plane data or the control plane data. A connection between the primary access network device and the terminal device may be referred to as a primary connection. The primary connection may also be used to transmit the user plane data or the control plane data. That is, the user plane data of the terminal device may be transmitted only through the primary connection or the secondary connection, or the user plane data may also be transmitted through both the primary connection and the secondary connection; and the control plane data of the terminal device may be transmitted only through the primary connection or the secondary connection, or the control plane data may also be transmitted through both the primary connection and the secondary connection, and the data transmission mode is not limited in the embodiment of the present disclosure.

Further, the data includes uplink data and downlink data, where the uplink data includes uplink control plane data and uplink user plane data, and the downlink data includes downlink control plane data and downlink user plane data, that is, it will be appreciated that the transmission in the present disclosure is uplink transmission and/or downlink transmission.

As an optional embodiment, the secondary connection addition request message further includes second configuration information, where the second configuration information is configuration information of the secondary connection that has been established by the terminal device.

Specifically, when the secondary network access capability information is used to indicate the maximum capability for the terminal device to access the secondary access network device, that is, an access capability parameter of the terminal device in the prior art, for example, a total number of bits carried in a downlink shared channel during one transmission time interval (TTI), a total number of soft channel bits, or the maximum number of layers supporting space division multiplexing. The primary access network device may carry the secondary network access capability information and the configuration information of the secondary connection that has been established by the terminal device in the secondary connection addition request message sent to the first secondary access network device, so that the first secondary access network device makes reference to both the secondary network access capability information and the second configuration information in the secondary connection addition request message when generating the first configuration information. For example, it is possible to enable a configuration of all secondary connections to be not greater than the access network capability of the terminal device indicated in the secondary network access capability information.

Optionally, the secondary connection addition request message may further carry measurement result information, quality of service (Quality of Service, "QoS" for short), etc., of the secondary access network device, so that the secondary access network device determines, according to these information, whether it is allowed to establish the secondary connection. Moreover, when determining, according to these information and current load status of the secondary access network device, that it is allowed to establish the secondary connection, the secondary access network device generates, according to the secondary connection addition request message, configuration information for establishing the secondary connection, and returns a confirmation message of the secondary connection addition request message to the primary access network device, where the confirmation message carries secondary connection configuration information for establishing the secondary connection; and when determining, according to these information, that it is not allowed to establish the secondary connection, the secondary access network device returns failure indication information to the first primary access network device, where the failure indication information carries a reason why it is not allowed to establish the secondary connection, for example, the QoS of the secondary access network device cannot satisfy the data transmission, the secondary access network device has an excessive low link quality, and the secondary access network device is currently in a congestion state. When the primary access network device receives the measurement result information reported by the terminal device for the secondary access network device again, the primary access network device may determine, according to the failure reason in the failure indication information, whether to send the measurement result information to the first secondary access network device. For example, when the failure reason for the first secondary access network device is network congestion, the primary access network device may not send the measurement result information to the first secondary access network device when receiving the measurement result information of the first secondary access network device again, which can reduce power consumption.

As an optional embodiment, the terminal device may carry the secondary network access capability information in a radio resource control (RRC) connection establishment request message initiated to the primary access network device; when the RRC connection is established, the terminal device may carry the secondary network access capability information in an RRC connection establishment complete message sent to the primary access network device; the terminal device may also carry the secondary network access capability information in an RRC reconfiguration complete message sent to the primary access network device, and the terminal device may carry the secondary network access capability information in any air interface message initiated to the primary access network device, which is not limited in the present disclosure.

The primary access network device may also acquire the secondary network access capability information of the terminal device from the core network device. For example, when the terminal device is powered on for the first time to perform an attach process, the secondary network access capability information is sent to a core network device through network attached storage (NAS) information.

As an optional embodiment, before the primary access network device sends the secondary connection addition request message to the first secondary access network device, including: the primary access network device receives measurement result information of at least one secondary access network device sent by the terminal device, where the measurement result information is used to indicate a link quality between a respective secondary access network device and the terminal device; and the primary access network device determines the first secondary access network device according to measurement result information of each of the at least one secondary access network device.

Specifically, the terminal device may send measurement result information of multiple secondary access network devices to the primary access network device in the process of accessing the primary access network device. After receiving the measurement result information from the terminal device, the primary access network device determines, according to the measurement result information, which secondary access network device to add. The terminal device sends the measurement result information of the multiple secondary access network devices to the primary access network device, according to which the secondary access network device may be selected as a network device for transmitting data, and the data may be offloaded to the secondary access network device as early as possible, so that the secondary connection established by the primary access network device may be used to offload the data for the primary access network device as early as possible, and the transfer load of the primary access network device may be reduced.

As an optional embodiment, the method further includes: the primary access network device sends the first configuration information to the terminal device so that the terminal device establishes the secondary connection with the first secondary access network device according to the first configuration information.

Optionally, the primary access network device is a network device in a first communication system, and the secondary access network device is a network device in a second communication system. Preferably, the primary access network device is a network device in an LTE system, and the secondary access network device is a network device in a new radio NR system.

FIG. 3 shows a schematic block diagram of a method 300 for establishing a secondary connection according to an embodiment of the present disclosure. The method 300 includes:

S310, a first secondary access network device receives a secondary connection addition request message sent by a primary access network device, where the secondary connection addition request message is used to request addition of the first secondary access network device as a network device for transmitting data, and the secondary connection addition request message includes secondary network access capability information, where the secondary network access capability information is used to indicate a capability for the terminal device to access a secondary access network device;

S320, the first secondary access network device generates first configuration information according to the secondary network access capability information, where the first configuration information is used to establish the secondary connection between the first secondary access network device and the terminal device; and S330, the first secondary access network device sends a confirmation message of the secondary connection addition request message to the primary access network device, where the confirmation message of the secondary connection addition request message includes the first configuration information.

Specifically, the primary access network device may send the secondary network access capability information of the terminal device acquired from the terminal device or a core network device to the first secondary access network device. The first secondary access network device may generate configuration information for establishing the secondary connection between the first secondary access network device and the terminal device with reference to the secondary network access capability information, and transmit the configuration information to the primary access network device. The network device may forward the configuration information to the terminal device to establish the secondary connection between the first secondary access network device and the terminal device.

Therefore, the embodiment of the present disclosure provides a new method for establishing a secondary connection, which is simple and flexible, thereby improving the data throughput in the user plane and reducing the load of the primary access network device.

It should be understood that the secondary network access capability information may be all capability information for the terminal device to connect to the secondary access network device, or may be access network capability information that may be used by the terminal device in all secondary network connections, or may be access network capability information that can be used by the terminal device to connect to a to-be-added access network device, which is not limited in the embodiment of the present disclosure as long as the secondary network access capability information includes the capability information for the terminal device to connect to the above first secondary access network device.

If the secondary network access capability information is all capability information for the terminal to connect to the secondary access network device, the secondary connection addition request message sent by the primary access network device to the first secondary access network device further carries configuration information of the secondary connection that has been established by the terminal device, and the first secondary access network device may generate first configuration information with reference to the secondary network access capability information and the configuration information carried in the secondary connection addition request message. For example, a configuration of all secondary connections established by the terminal device is not greater than the capability indicated in the secondary network access capability information.

If the secondary network access capability information is a part of capability allocated by the terminal device for accessing the first secondary access network device, the first secondary access network device, after receiving the secondary network access capability information, needs to ensure that a configuration for the terminal device by the first secondary access network device is not greater than the capability indicated in the secondary network access capability information.

It should be understood that the secondary network access capability information may also indicate a part of capability information allocated by the terminal device to multiple access network devices that are to be added at a time. For example, data blocks that can be transmitted by the terminal device during its access to an access network device have a maximum number of 32, and the terminal device wants to add a first secondary access network device and a second secondary access network device at a time, then the terminal device may separately allocate, to the first secondary access network device and the second secondary access network device, a maximum number of 16 data blocks that can be transmitted. If the secondary connection between the first secondary access network device and the terminal device is first established, the first secondary access network device determines first configuration information according to the allocated secondary network access capability information, where the maximum number of to-be-transmitted data blocks in the first configuration information is not greater than 16; if the primary access network device wants to further add the second secondary access network device as the secondary connection, the first secondary access network device may determine second configuration information according to the allocated secondary network access capability information and the first configuration information, where a sum of maximum numbers of to-be-transmitted data blocks in the second configuration information and the first configuration information is not greater than 16.

It should be noted that reference may be specifically made to the method 200 for a process between the first secondary access network device and the primary access network device in the method 300. For brevity, details will not be described herein again.

FIG. 4 shows a schematic block diagram of a method 400 for establishing a secondary connection according to an embodiment of the present disclosure. The method 400 including:

S410, a terminal device sends secondary network access capability information of the terminal device to a primary access network device, where the secondary network access capability information is used to indicate a capability for the terminal device to access a secondary access network device.

S420, the terminal device receives first configuration information sent by the primary access network device, where the first configuration information is used to establish the secondary connection between the first secondary access network device and the terminal device.

Specifically, the primary access network device may acquire secondary network access capability information of the terminal device from the terminal device or a core network device, and send the secondary network access capability information to the first secondary access network device, so that the first secondary access network device may generate configuration information for establishing a secondary connection between the first secondary access network device and the terminal device with reference to the secondary network access capability information. After receiving the configuration information, the primary access network device forwards the configuration information to the terminal device to establish the secondary connection between the first secondary access network device and the terminal device.

Therefore, the embodiment of the present disclosure provides a new method for establishing a secondary connection, which is simple and flexible, thereby improving the data throughput in the user plane and reducing the load of the primary access network device.

As an optional embodiment, the method further includes: the terminal device sends measurement result information of multiple secondary access network devices to the primary access network device, where the measurement result information is used to indicate a link quality between a respective secondary access network device and the terminal device, so that the primary access network device determines the first secondary access network device according to the multiple measurement result information.

Specifically, when a channel quality between the terminal device and the secondary access network device satisfies a preset condition, the terminal device sends the measurement result information to the primary access network device. The preset condition may be: a specific period provided according to a protocol; or may be that the terminal device detects that its channel quality with the secondary access network device is higher than its channel quality with the first primary access network device; or may be when it is detected that the channel quality of the secondary access network device is greater than a certain threshold; or may be that the current reference signal power is less than a preset threshold, etc., or may be a real-time measurement, a real-time reporting and the like by the terminal device. The triggering condition for the terminal device to report the measurement result information is not limited in the embodiment of the present disclosure.

As an optional embodiment, the step of sending, by the terminal device, the secondary network access capability information of the terminal device to the primary access network device includes: the terminal device sends a first message to the primary access network device, where the first message is used to indicate that the a configuration between the terminal device and the first secondary access network device is valid, and the first message includes the secondary network access capability information.

As an optional embodiment, the method further includes: the terminal device establishes the secondary connection with the first secondary access network device according to the first configuration information.

It should be noted that reference may be specifically made to the method 200 for a process between the terminal device and the primary access network device in the method 400. For brevity, details will not be described herein again.

To facilitate the understanding, the method for establishing the secondary connection according to the embodiments of the present disclosure will be described in detail from the perspective of the interaction among the terminal device, the primary access network device, and the secondary access network device in conjunction with FIG. 5-FIG. 6.

FIG. 5 shows a schematic flow chart of a method 500 for establishing a secondary connection according to an embodiment of the present disclosure. As shown in FIG. 5, the method 500 includes:

S510, a primary access network device in an LTE system acquires NR capability information of a terminal device, where the NR capability information is used to indicate the maximum capability for the terminal device to access an access network device in an NR system;

S520, the primary access network device in the LTE system determines to add a first secondary access network device in the NR system, and sends an NR addition request to the first secondary access network device, where the NR capability information of the terminal device is carried in the NR addition request;

S530, after receiving the NR addition request sent by the primary access network device in the LTE system, the first secondary access network device in the NR system performs a secondary connection configuration between the first secondary access network device and the terminal device according to the NR capability information of the terminal device, that is, first configuration information, and feeds back to the primary access network device in the LTE system;

S540, the primary access network device in the LTE system sends the secondary connection configuration between the first secondary access network device and the terminal device to the terminal device through an RRC reconfiguration message;

S550, when determining to add a second secondary access network device in the NR system as a second secondary connection, the primary access network device in the LTE system sends the NR capability information of the terminal device and the secondary connection configuration between the first secondary access network device and the terminal device to the second secondary access network device in the NR system though an addition request;

S560, the second secondary access network device in the NR system generates a secondary connection configuration between the second secondary access network device in the NR system and the terminal device according to the NR capability information of the terminal and the secondary connection configuration between the first secondary access network device in the NR system and the terminal device, that is, second configuration information, and feeds back to the primary access network device in the LTE system; and S570, the primary access network device in the LTE system sends the secondary connection configuration between the second secondary access network device and the terminal device to the terminal device through an RRC reconfiguration message.

Therefore, the embodiment of the present disclosure provides a new method for establishing a secondary connection, which is simple and flexible, thereby improving the data throughput in the user plane and reducing the load of the primary access network device.

Figure 6:
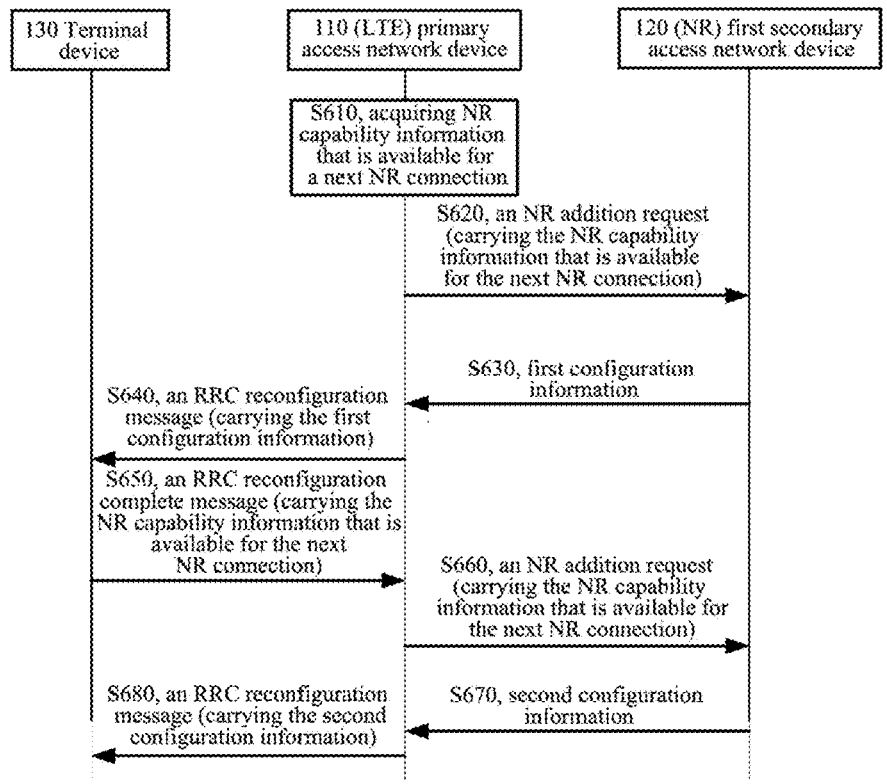
FIG. 6 is another schematic flow chart of a method for establishing a secondary connection according to an embodiment of the present disclosure.

FIG. 6 shows a schematic flow chart of a method 600 for establishing a secondary connection according to an embodiment of the present disclosure. As shown in FIG. 6, the method 600 includes:

S610, a primary access network device in an LTE system acquires NR capability information of a terminal device, where the NR capability information is used to indicate NR capability information that is available for a next NR connection.

S620, the primary access network device in the LTE system determines to add a first secondary access network device in an NR system, and sends an NR addition request to the first secondary access network device, where the NR capability that is available for the next NR connection is carried in the NR addition request;

S630, after receiving the NR addition request sent by the primary access network device in the LTE system, the first secondary access network device in the NR system performs a secondary connection configuration between the first secondary access network device and the terminal device according to the NR capability information of the terminal device, that is, first configuration information, and feeds back to the primary access network device in the LTE system;

S640, the primary access network device in the LTE system sends the secondary connection configuration between the first secondary access network device and the terminal device to the terminal device through an RRC reconfiguration message;

S650, the terminal device carries the NR capability information that is available for the next NR connection through an RRC reconfiguration complete message;

S660, when determining to add a second secondary access network device in the NR system as a second secondary connection, the primary access network device in the LTE system sends the NR capability information that is available for the next NR connection to the second secondary access network device in the NR system;

S670, the second secondary access network device in the NR system generates a secondary connection configuration between the second secondary access network device in the NR system and the terminal device according to the NR capability information that is available for the next NR connection, that is, second configuration information, and feeds back to the primary access network device in the LTE system; and S680, the primary access network device in the LTE system sends the secondary connection configuration between the second secondary access network device and the terminal device to the terminal device through an RRC reconfiguration message.

Therefore, the embodiment of the present disclosure provides a new method for establishing a secondary connection, which is simple and flexible, thereby improving the data throughput in the user plane and reducing the load of the primary access network device.

It should be understood that FIG. 5 and FIG. 6 show detailed steps or operations of the method for establishing the secondary connection, but these steps or operations are merely examples. Other operations or transformations of the operations in FIG. 5 or FIG. 6 may be performed in the embodiments of the present disclosure. Moreover, the steps in FIG. 5 and FIG. 6 may be performed in an order different from that presented in FIG. 5 and FIG. 6. Moreover, it is possible that not all operations in FIG. 5 and FIG. 6 are to be performed.

In addition, in the above method embodiments, the step on the terminal device side may be separately implemented as a method for establishing a secondary connection on the terminal device side, and the step on the primary access network device side may be separately implemented as a method for establishing a secondary connection on the access network side, and the step on the secondary access network device side may also be separately implemented as a method for establishing a secondary connection on the access network side. In the above method embodiments, the access network device is usually a base station, the core network device is usually a mobile management entity, and the terminal device is usually user equipment.

It should be understood that the interaction between the network device and the terminal device described on the network device side, relevant characteristics and functions thereof correspond to relevant characteristics and functions on the terminal device side. For brevity, details will not be described herein.

It should also be understood that, in various embodiments of the present disclosure, the sequence numbers of the above processes do not imply an execution order. The execution order of the processes should be determined by their functions and internal logic, but is not intended to limit an implementation in the embodiments of the present disclosure.

The method for establishing the secondary connection according to the embodiments of the present disclosure is described in detail above with reference to FIG. 2-FIG. 6. Then, an apparatuses for establishing a secondary connection according to an embodiment of the present disclosure will be described hereunder with reference to FIG. 7-FIG.

12. The technical features described in the method embodiments are applicable to the following apparatus embodiments.

Figure 7:
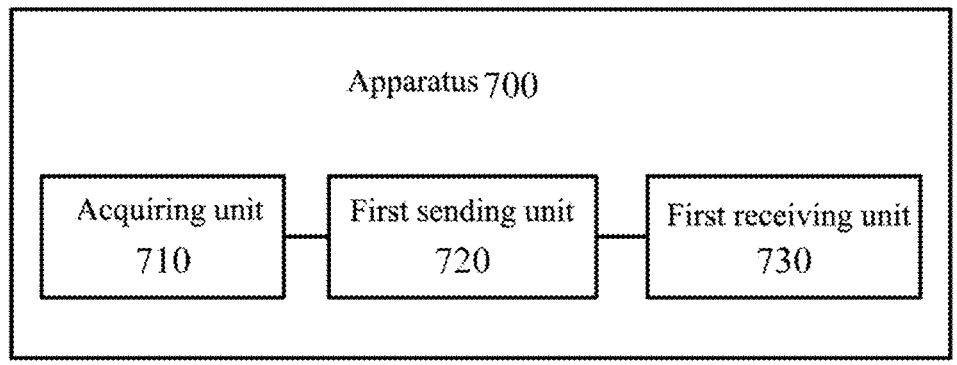
FIG. 7 is a schematic block diagram of an apparatus for establishing a secondary connection according to an embodiment of the present disclosure.

FIG. 7 shows a schematic block diagram of an apparatus 700 for establishing a secondary connection according to an embodiment of the present disclosure. As shown in FIG. 7, the apparatus 700 includes:

an acquiring unit 710, configured to acquire secondary network access capability information of a terminal device, where the secondary network access capability information is used to indicate a capability for the terminal device to access a secondary access network device;

a first sending unit 720, configured to send a secondary connection addition request message to a first secondary access network device, where the secondary connection addition request message is used to request addition of the first secondary access network device as a network device for transmitting data, and the secondary connection addition request message includes the secondary network access capability information;

a first receiving unit 730, configured to receive a confirmation message of the secondary connection addition request message sent by the first secondary access network device, wherein the confirmation message of the secondary connection addition request message comprises first configuration information, and the first configuration information is used to establish the secondary connection between the first secondary access network device and the terminal device.

Specifically, the apparatus 700 may acquire secondary network access capability information of the terminal device from the terminal device or a core network device, and send the secondary network access capability information to the first secondary access network device, so that the first secondary access network device may generate configuration information for establishing a secondary connection between the first secondary access network device and the terminal device with reference to the secondary network access capability information. After receiving the configuration information, the apparatus 700 forwards the configuration information to the terminal device to establish the secondary connection between the first secondary access network device and the terminal device.

Therefore, the embodiment of the present disclosure provides a new apparatus for establishing a secondary connection, which is simple and flexible, thereby improving the data throughput in the user plane and reducing the load of the primary access network device.

Optionally, in an embodiment of the present disclosure, the secondary connection addition request message further includes second configuration information, where the second configuration information is configuration information of the secondary connection that has been established by the terminal device.

Optionally, in an embodiment of the present disclosure, the acquiring unit 710 is specifically configured to:

receive a first message sent by the terminal device or a core network device, where the first message includes the secondary network access capability information;

acquire the secondary network access capability information from the first message.

Optionally, in an embodiment of the present disclosure, the first message received by the acquiring unit 710 and sent by the terminal device is used to indicate that a configuration between the terminal device and the first secondary access network device is valid.

Optionally, in an embodiment of the present disclosure, the secondary network access capability information is used to indicate the maximum capability for the terminal device to access the secondary access network device, or the secondary network access capability information is used to indicate a capability for the terminal device to access a to-be-added secondary access network device, where the to-be-added secondary access network device includes the first secondary access network device.

Optionally, in an embodiment of the present disclosure, the apparatus 700 further includes:

a second receiving unit 740, configured to receive measurement result information of at least one secondary access network device sent by the terminal device, where the measurement result information is used to indicate a link quality between a respective secondary access network device and the terminal device;

a determining unit 750, configured to determine the first secondary access network device according to measurement result information of each of the at least one secondary access network device.

Optionally, in an embodiment of the present disclosure, the apparatus 700 further includes:

a second sending unit 760, configured to send the first configuration information to the terminal device so that the terminal device establishes the secondary connection with the first secondary access network device according to the first configuration information.

Optionally, in an embodiment of the present disclosure, the apparatus is a network device in a first communication system, and the secondary access network device is a network device in a second communication system.

It should be understood that the apparatus 700 according to the embodiment of the present disclosure may correspond to an execution body of the method 200 for establishing the secondary connection according to the embodiment of the present disclosure, and the above and other operations and/or functions of the various modules in the apparatus 700 are respectively used to implement the corresponding processes of the methods in FIG. 2, FIG. 5 and FIG. 6. For brevity, details will not be described herein again.

Figure 8:
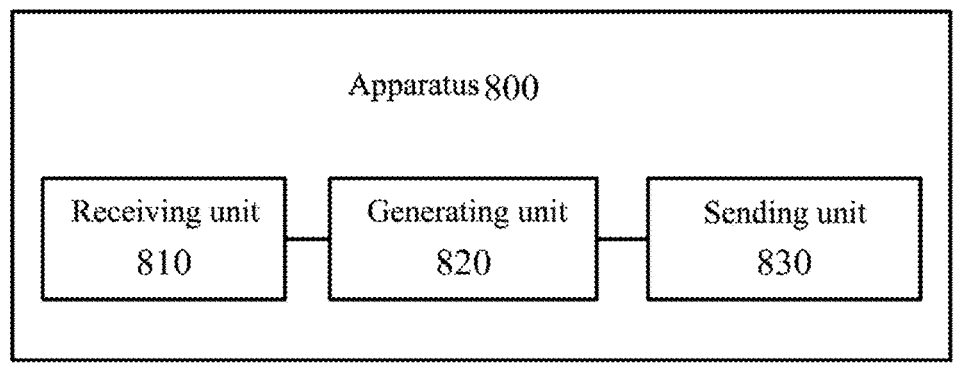
FIG. 8 is another schematic block diagram of an apparatus for establishing a secondary connection according to an embodiment of the present disclosure.

FIG. 8 shows a schematic block diagram of an apparatus 800 for establishing a secondary connection according to an embodiment of the present disclosure. As shown in FIG. 8, the apparatus 800 includes:

a receiving unit 810, configured to receive a secondary connection addition request message sent by a primary access network device, where the secondary connection addition request message is used to request addition of a first secondary access network device as a network device for transmitting data, and the secondary connection addition request message includes secondary network access capability information, where the secondary network access capability information is used to indicate a capability for the terminal device to access a secondary access network device;

a generating unit 820, configured to generate first configuration information according to the secondary network access capability information, where the first configuration information is used to establish the secondary connection between the first secondary access network device and the terminal device; and a sending unit 830, configured to send a confirmation message of the secondary connection addition request message to the primary access network device, where the confirmation message of the secondary connection addition request message includes the first configuration information.

Specifically, the primary access network device may acquire secondary network access capability information of the terminal device from the terminal device or a core network device, and send the secondary network access capability information to the apparatus 800, so that the apparatus 800 may generate configuration information for establishing a secondary connection between the apparatus 800 and the terminal device with reference to the secondary network access capability information. After receiving the configuration information, the primary access network device forwards the configuration information to the terminal device to establish the secondary connection between the apparatus 800 and the terminal device.

Therefore, the embodiment of the present disclosure provides a new apparatus for establishing a secondary connection, which is simple and flexible, thereby improving the data throughput in the user plane and reducing the load of the primary access network device.

Optionally, in an embodiment of the present disclosure, the secondary network access capability information is used to indicate the maximum capability for the terminal device to access the secondary access network device, where the secondary connection addition request message further includes second configuration information which is configuration information of the secondary connection that has been established by the terminal device, and the generating unit 820 is specifically configured to:

generate the first configuration information according to the secondary network access capability information and the second configuration information, where a sum of configurations corresponding to the first configuration information and the second configuration information does not exceed the capability for the terminal device to access the secondary access network device indicated in the secondary network access capability information.

Optionally, in an embodiment of the present disclosure, the secondary network access capability information is used to indicate a capability for the terminal device to access a to-be-added secondary access network device, where the to-be-added secondary access network device includes the first secondary access network device.

Optionally, in an embodiment of the present disclosure, the primary access network device is a network device in a first communication system, and the secondary access network device is a network device in a second communication system.

It should be understood that the apparatus 800 according to the embodiment of the present disclosure may correspond to an execution body of the method 300 for establishing the secondary connection according to the embodiment of the present disclosure, and the above and other operations and/or functions of the various modules in the apparatus 800 are respectively used to implement the corresponding processes of the methods in FIG. 3, FIG. 5 and FIG. 6. For brevity, details will not be described herein again.

Figure 9:
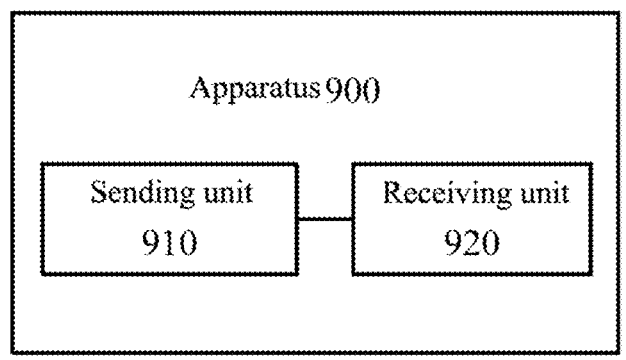
FIG. 9 is still another schematic block diagram of an apparatus for establishing a secondary connection according to an embodiment of the present disclosure.

FIG. 9 shows a schematic block diagram of an apparatus 900 for establishing a secondary connection according to an embodiment of the present disclosure. As shown in FIG. 9, the apparatus 900 includes:

a sending unit 910, configured to send secondary network access capability information of a terminal device to a primary access network device, where the secondary network access capability information is used to indicate a capability for the terminal device to access a secondary access network device; and a receiving unit 920, configured to receive first configuration information sent by the primary access network device, where the first configuration information is used to establish the secondary connection between the first secondary access network device and the terminal device.

Specifically, the primary access network device may acquire secondary network access capability information of the terminal device from the apparatus 900, and send the secondary network access capability information to the first secondary access network device, so that the first secondary access network device may generate configuration information for establishing a secondary connection between the first secondary access network device and the apparatus 900 with reference to the secondary network access capability information. After receiving the configuration information, the primary access network device forwards the configuration information to the apparatus 900 to establish the secondary connection between the first secondary access network device and the apparatus 900.

Therefore, the embodiment of the present disclosure provides a new apparatus for establishing a secondary connection, which is simple and flexible, thereby improving the data throughput in the user plane and reducing the load of the primary access network device.

Optionally, in an embodiment of the present disclosure, the sending unit 910 is specifically configured to:

send a first message to the primary access network device, where the first message is used to indicate that a configuration between the terminal device and the first secondary access network device is valid, and the first message includes the secondary network access capability information.

Optionally, in an embodiment of the present disclosure, the secondary network access capability information is used to indicate the maximum capability for the terminal device to access the secondary access network device, or the secondary network access capability information is used to indicate a capability for the terminal device to access a to-be-added secondary access network device, where the to-be-added secondary access network device includes the first secondary access network device.

Optionally, in an embodiment of the present disclosure, the apparatus 900 further includes:

an accessing unit 930, configured to establish the secondary connection with the first secondary access network device according to the first configuration information.

Optionally, in an embodiment of the present disclosure, the primary access network device is a network device in a first communication system, and the secondary access network device is a network device in a second communication system.

It should be understood that the apparatus 900 according to the embodiment of the present disclosure may correspond to an execution body of the method 400 for establishing the secondary connection according to the embodiment of the present disclosure, and the above and other operations and/or functions of the various modules in the apparatus 900 are respectively used to implement the corresponding processes of the methods in FIG. FIG. 4, FIG. 5 and FIG. 6. For brevity, details will not be described herein again.

It should be noted that, when the apparatuses provided in the above embodiments implement their functions, the division of the above functional units is merely illustrative. In an actual application, the above functions may be distributed to different functional units to complete, as needed. That is, the internal structure of the apparatus is divided into different functional units to complete all or part of the functions described above. In addition, the device and method embodiments provided in the above embodiments are in the same concept, of which the specific implementation processes are described in detail in the method embodiments, and details will not be described herein again.

Figure 10:
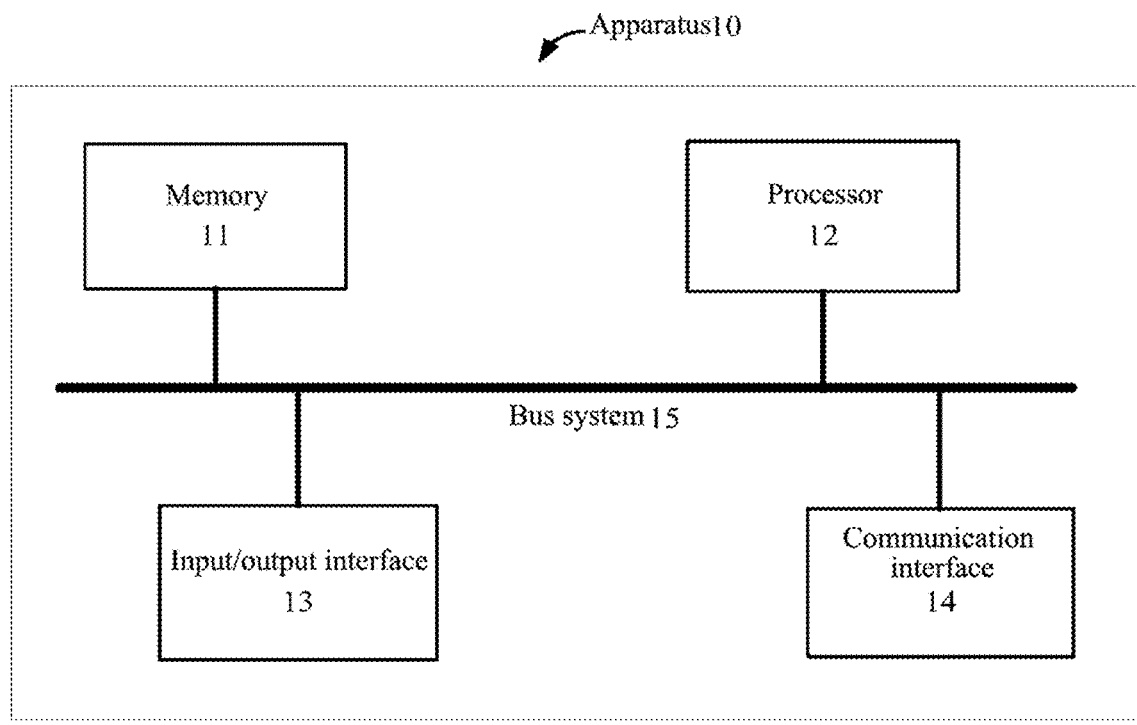
FIG. 10 is still another schematic block diagram of an apparatus for establishing a secondary connection according to an embodiment of the present disclosure.

FIG. 10 shows a schematic block diagram of an apparatus 10 according to an embodiment of the present disclosure. The apparatus 10 shown in FIG. 10 includes a memory 11, a processor 12, an input/output interface 13, a communication interface 14 and a bus system 15, where the memory 11, the processor 12, the input/output interface 13 and the communication interface 14 are connected via the bus system 15, the memory 11 is used to store instructions, the processor 12 is used to execute the instructions stored in the memory 11 to control the input/output interface 13 to receive input data and information and to output data such as operation results, and control the communication interface 14 to send a signal.

The processor 12 is configured to acquire secondary network access capability information of a terminal device, where the secondary network access capability information is used to indicate a capability for the terminal device to access a secondary access network device; send a secondary connection addition request message to a first secondary access network device, where the secondary connection addition request message is used to request addition of the first secondary access network device as a network device for transmitting data, and the secondary connection addition request message includes the secondary network access capability information; receive a confirmation message of the secondary connection addition request message sent by the first secondary access network device, where the confirmation message of the secondary connection addition request message includes first configuration information which is used to establish the secondary connection between the first secondary access network device and the terminal device.

Optionally, in an embodiment of the present disclosure, the secondary connection addition request message further includes second configuration information, where the second configuration information is configuration information of the secondary connection that has been established by the terminal device.

Optionally, in an embodiment of the present disclosure, the processor 12 is specifically configured to: receive a first message sent by the terminal device or a core network device, where the first message includes the secondary network access capability information; and acquire the secondary network access capability information from the first message.

Optionally, in an embodiment of the present disclosure, the processor 12 is specifically configured to: receive the first message sent by the terminal device, where the first message is used to indicate that a configuration between the terminal device and the first secondary access network device is valid.

Optionally, in an embodiment of the present disclosure, the secondary network access capability information is used to indicate the maximum capability for the terminal device to access the secondary access network device; or the secondary network access capability information is used to indicate a capability for the terminal device to access a to-be-added secondary access network device, where the to-be-added secondary access network device includes the first secondary access network device.

Optionally, in an embodiment of the present disclosure, the processor 12 is specifically configured to: receive measurement result information of at least one secondary access network device sent by the terminal device, where the measurement result information is used to indicate a link quality between a respective secondary access network device and the terminal device; and determine the first secondary access network device according to measurement result information of each of the at least one secondary access network device.

Optionally, in an embodiment of the present disclosure, the processor 12 is further configured to: send the first configuration information to the terminal device so that the terminal device establishes the secondary connection with the first secondary access network device according to the first configuration information.

Optionally, in an embodiment of the present disclosure, the apparatus 10 is a network device in a first communication system, and the secondary access network device is a network device in a second communication system.

It should be understood that, in an embodiment of the present disclosure, the processor 12 may use a general-purpose central processing unit (CPU), a microprocessor, an application specific integrated circuit (ASIC), or one or more integrated circuits for implementing a relevant program to implement the technical solution provided in the embodiment of the present disclosure.

It should also be understood that the communication interface 14 uses, but is not limited to, a transceiver device such as a transceiver to achieve communications between the apparatus 10 and other devices or communication networks.

The memory 11 may include a read-only memory and a random access memory and provide instructions and data to the processor 12. A portion of the processor 12 may also include a non-volatile random access memory. For example, the processor 12 may also store device type information.

In addition to a data bus, the bus system 15 may also include a power bus, a control bus, a status signal bus, and the like. However, for clarity of description, various buses are marked as the bus system 15 in the drawing.

During an implementation, the steps of the above method may be completed by an integrated logic circuit of hardware in the processor 12 or an instruction in the form of software. A method for establishing a secondary connection disclosed in the embodiments of the present disclosure may be directly implemented by a hardware processor, or may be implemented by a combination of hardware and software modules in the processor. The software module may be located in a mature storage medium in the art, such as a random access memory, a flash memory, a read-only memory, a programmable read-only memory or an electrically erasable programmable memory, a register or the like. The storage medium is located in the memory 11, and the processor 12 reads information in the memory 11 and completes the steps of the above method 200 in conjunction with its hardware. To avoid redundancy, details will not be described herein.

Figure 11:
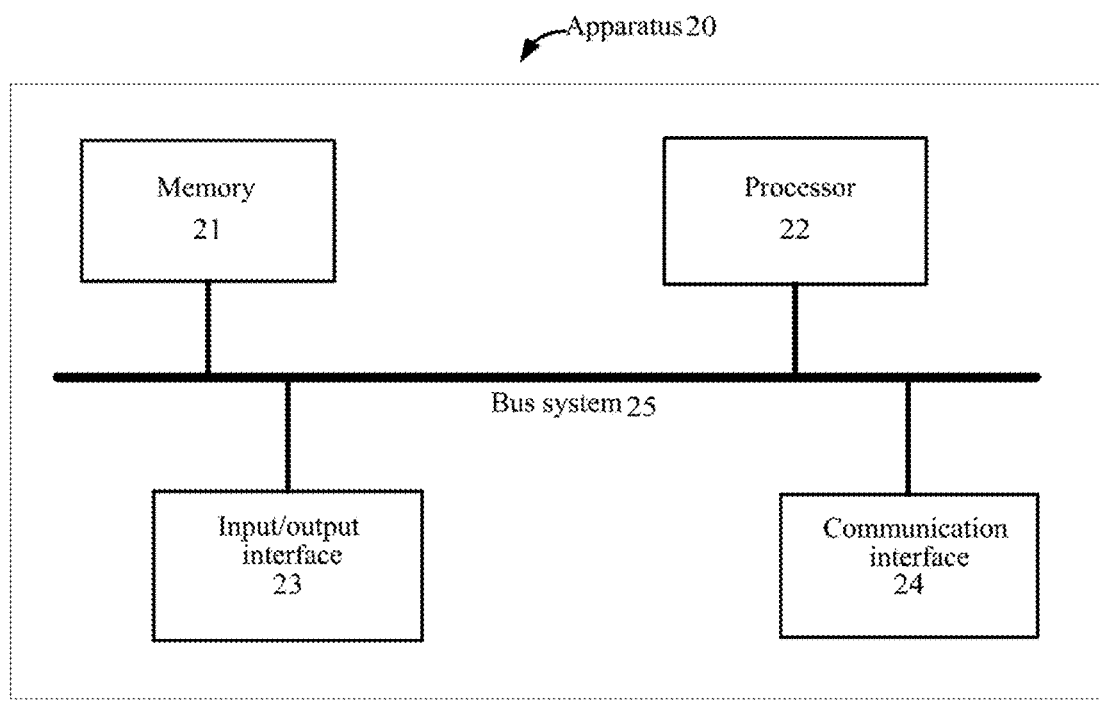
FIG. 11 is still another schematic block diagram of an apparatus for establishing a secondary connection according to an embodiment of the present disclosure.

FIG. 11 shows a schematic block diagram of an apparatus 20 according to an embodiment of the present disclosure. The apparatus 20 shown in FIG. 11 includes a memory 21, a processor 22, an input/output interface 23, a communication interface 24 and a bus system 25, where the memory 21, the processor 22, the input/output interface 23 and the communication interface 24 are connected via the bus system 25, the memory 21 is used to store instructions, the processor 22 is used to execute the instructions stored in the memory 21 to control the input/output interface 23 to receive input data and information and to output data such as operation results, and control the communication interface 24 to send a signal.

The processor 22 is configured to receive a secondary connection addition request message sent by a primary access network device, where the secondary connection addition request message is used to request addition of the first secondary access network device as a network device for transmitting data, and the secondary connection addition request message includes secondary network access capability information, where the secondary network access capability information is used to indicate a capability for the terminal device to access a secondary access network device; generate first configuration information according to the secondary network access capability information, where the first configuration information is used to establish the secondary connection between the first secondary access network device and the terminal device; and send a confirmation message of the secondary connection addition request message to the primary access network device, where the confirmation message of the secondary connection addition request message includes the first configuration information.

Optionally, in an embodiment of the present disclosure, the secondary network access capability information is used to indicate the maximum capability for the terminal device to access the secondary access network device, where the secondary connection addition request message further includes second configuration information which is configuration information of the secondary connection that has been established by the terminal device, and the processor 22 is specifically configured to generate the first configuration information according to the secondary network access capability information and the second configuration information, where a sum of configurations corresponding to the first configuration information and the second configuration information does not exceed the capability for the terminal device to access the secondary access network device indicated in the secondary network access capability information.

Optionally, in an embodiment of the present disclosure, the secondary network access capability information is used to indicate a capability for the terminal device to access a to-be-added secondary access network device, where the to-be-added secondary access network device includes the first secondary access network device.

It should be understood that, in an embodiment of the present disclosure, the processor 22 may use a general-purpose central processing unit (CPU), a microprocessor, an application specific integrated circuit (ASIC), or one or more integrated circuits for implementing an relevant program to implement the technical solution provided in the embodiment of the present disclosure.

It should also be understood that the communication interface 24 uses, but is not limited to, a transceiver device such as a transceiver to achieve communications between the apparatus 20 and other devices or communication networks.

The memory 21 may include a read-only memory and a random access memory, and provide instructions and data to the processor 22. A portion of the processor 22 may also include a non-volatile random access memory. For example, the processor 22 may also store device type information.

In addition to a data bus, the bus system 25 may also include a power bus, a control bus, a status signal bus, and the like. However, for clarity of description, various buses are marked as the bus system 25 in the drawing.

During an implementation, the steps of the above method may be completed by an integrated logic circuit of hardware in the processor 22 or an instruction in the form of software.

The method for establishing the secondary connection disclosed in the embodiment of the present disclosure may be directly implemented by a hardware processor, or may be completed by a combination of hardware and software modules in the processor. The software module may be located in a mature storage medium in the art, such as a random access memory, a flash memory, a read-only memory, a programmable read-only memory or an electrically erasable programmable memory, a register, or the like. The storage medium is located in the memory 21, and the processor 22 reads information in the memory 21 and completes the steps of the above method 300 in conjunction with its hardware. To avoid redundancy, details will not be described herein.

Figure 12:
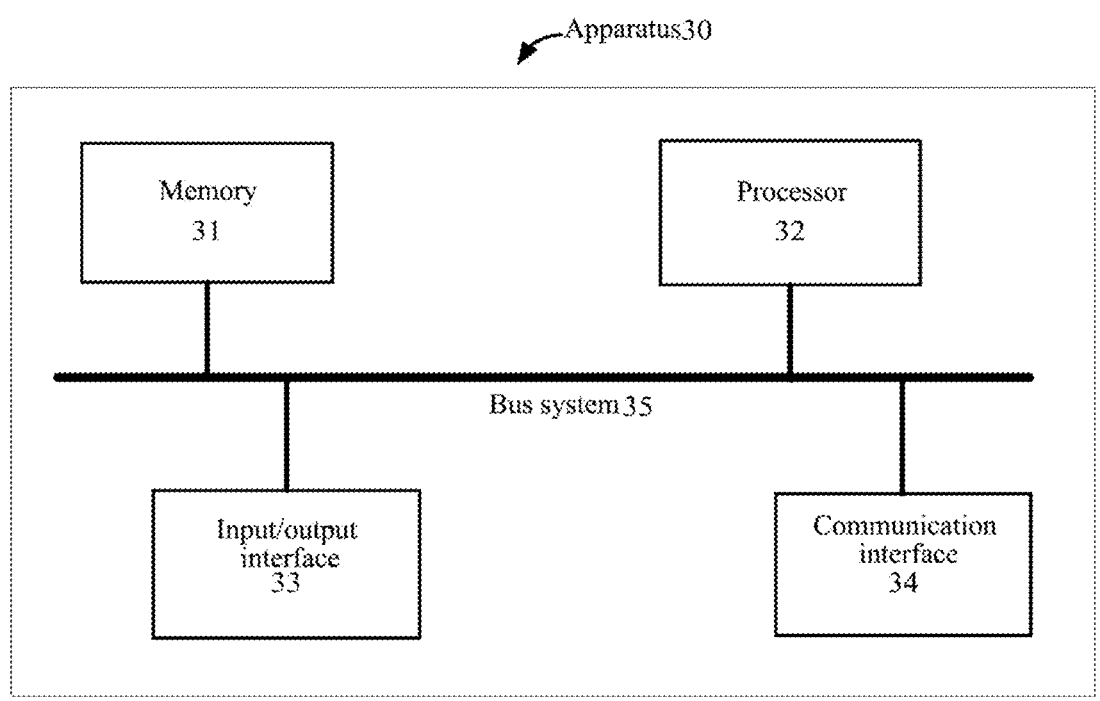
FIG. 12 is still another schematic block diagram of an apparatus for establishing a secondary connection according to an embodiment of the present disclosure.

FIG. 12 shows a schematic block diagram of an apparatus 30 according to an embodiment of the present disclosure. The apparatus 30 shown in FIG. 12 includes a memory 31, a processor 32, an input/output interface 33, a communication interface 34 and a bus system 35, where the memory 31, the processor 32, the input/output interface 33 and the communication interface 34 are connected via the bus system 35, the memory 31 is used to store instructions, the processor 32 is used to execute the instructions stored in the memory 31 to control the input/output interface 33 to receive input data and information and to output data such as operation results, and control the communication interface 34 to send a signal.

The processor 32 is configured to send secondary network access capability information of a terminal device to a primary access network device, where the secondary network access capability information is used to indicate a capability for the terminal device to access a secondary access network device; and receive first configuration information sent by the primary access network device, where the first configuration information is used to establish the secondary connection between the first secondary access network device and the terminal device.

Optionally, in an embodiment of the present disclosure, the processor 32 is specifically configured to: send a first message to the primary access network device, where the first message is used to indicate that a configuration between the terminal device and the first secondary access network device is valid, and the first message includes the secondary network access capability information.

Optionally, in an embodiment of the present disclosure, the secondary network access capability information is used to indicate the maximum capability for the terminal device to access the secondary access network device, or the secondary network access capability information is used to indicate a capability for the terminal device to access a to-be-added secondary access network device, where the to-be-added secondary access network device includes the first secondary access network device.

Optionally, in an embodiment of the present disclosure, the processor 32 is further configured to: establish the secondary connection with the first secondary access network device according to the first configuration information.

It should be understood that, in an embodiment of the present disclosure, the processor 32 may use a general-purpose central processing unit (CPU), a microprocessor, an application specific integrated circuit (ASIC), or one or more integrated circuits for implementing an relevant program to implement the technical solution provided in the embodiment of the present disclosure.

It should also be understood that the communication interface 34 uses, but is not limited to, a transceiver device such as a transceiver to achieve communications between the apparatus 30 and other devices or communication networks.

The memory 31 may include a read-only memory and a random access memory, and provide instructions and data to the processor 32. A portion of the processor 32 may also include a non-volatile random access memory. For example, the processor 32 may also store device type information.

In addition to a data bus, the bus system 35 may also include a power bus, a control bus, a status signal bus, and the like. However, for clarity of description, various buses are marked as the bus system 35 in the drawing.

During an implementation, the steps of the above method may be completed by an integrated logic circuit of hardware in the processor 32 or an instruction in the form of software. A method for establishing a secondary connection disclosed in the embodiments of the present disclosure may be directly implemented by a hardware processor, or may be implemented by a combination of hardware and software modules in the processor. The software module may be located in a mature storage medium in the art, such as a random access memory, a flash memory, a read-only memory, a programmable read-only memory or an electrically erasable programmable memory, a register, or the like. The storage medium is located in the memory 31, and the processor 32 reads information in the memory 31 and completes the steps of the above method 400 in conjunction with its hardware. To avoid redundancy, details will not be described herein.

It should be understood that, in the embodiments of the present disclosure, "B corresponding to A" means that B is associated with A, and B may be determined according to A. However, it should also be understood that the determining of B according to A does not mean that B is determined according to A merely, but B may also be determined according to A and/or other information.

It should be understood that the term "and/or" herein is merely an association relationship describing associated objects, and indicates that there may be three relationships. For example, A and/or B may indicate: presence of A only, of both A and B and of B only. In addition, the character "/" herein generally indicates an "or" relationship between contextual objects.

It should be understood that, in various embodiments of the present disclosure, the sequence numbers of the above processes do not imply an execution order. The execution order of the processes should be determined by their functions and internal logic, but is not intended to limit an implementation in the embodiments of the present disclosure.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present disclosure.

Those skilled in the art can clearly understand that, for convenience and brevity of the description, for specific operation processes of the systems, the apparatuses and the units described above, reference may be made to the corresponding processes in the above method embodiments, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solutions of the embodiments.

In addition, the functional units in the embodiments of the present disclosure may be integrated into one processing module, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present disclosure, or a part of the technical solution of the present disclosure contributing to the prior art, or a part of the technical solution may be embodied in the form of a software product which is stored in a storage medium, including instructions for enabling a computer device (which may be a personal computer, a server, or a network device, etc.) to perform all or part of the steps of the methods described in the embodiments of the present disclosure. The above storage medium includes: various mediums capable of storing program codes, such as a USB flash disk, a mobile hard disk, a read-only memory (ROM), a random access memory (RAM), a magnetic disk, an optical disk, or the like.

The above description is only specific embodiments of the present disclosure, but the protection scope of the present disclosure is not limited thereto. Any modification or the substitution conceived by persons skilled in the art within the technical scope of the present disclosure should be covered in the protection scope of the present disclosure. Therefore, the protection scope of the present disclosure is subject to the protection scope of the appended claims.

What is claimed is:

1. A method for establishing a secondary connection, comprising:
   acquiring, by a primary access network device, secondary network access capability information of a terminal device, wherein the secondary network access capability information is used to indicate a capability for the terminal device to access a secondary access network device;
   sending, by the primary access network device, a secondary connection addition request message to a first secondary access network device, wherein the secondary connection addition request message is used to request addition of the first secondary access network device as a network device for transmitting data, and the secondary connection addition request message comprises the secondary network access capability information; and receiving, by the primary access network device, a confirmation message of the secondary connection addition request message sent by the first secondary access network device, wherein the confirmation message of the secondary connection addition request message comprises first configuration information, and the first configuration information is used to establish the secondary connection between the first secondary access network device and the terminal device;

wherein the acquiring, by the primary access network device, the secondary network access capability information of the terminal device comprises:

receiving, by the primary access network device, a first message sent by the terminal device, wherein the first message is used to indicate that a configuration between the terminal device and the first secondary access network device is valid, and the first message comprises the secondary network access capability information; and acquiring, by the primary access network device, the secondary network access capability information from the first message.

2. The method according to claim 1, wherein the secondary connection addition request message further comprises second configuration information, wherein the second configuration information is configuration information of the secondary connection that has been established by the terminal device.

3. The method according to claim 1, wherein the secondary network access capability information is used to indicate the maximum capability for the terminal device to access the secondary access network device; or the secondary network access capability information is used to indicate a capability for the terminal device to access a to-be-added secondary access network device, wherein the to-be-added secondary access network device comprises the first secondary access network device.

4. The method according to claim 1, wherein before the sending, by the primary access network device, the secondary connection addition request message to the first secondary access network device, comprising:

receiving, by the primary access network device, measurement result information of at least one secondary access network device sent by the terminal device, wherein the measurement result information is used to indicate a link quality between a respective secondary access network device and the terminal device; and determining, by the primary access network device, the first secondary access network device according to measurement result information of each of the at least one secondary access network device.

5. The method according to claim 1, wherein the method further comprises:

sending, by the primary access network device, the first configuration information to the terminal device so that the terminal device establishes the secondary connection with the first secondary access network device according to the first configuration information.

6. The method according to claim 1, wherein the primary access network device is a network device in a first communication system, and the secondary access network device is a network device in a second communication system.

7. An apparatus for establishing a secondary connection, comprising:

a memory, a processor, a communication interface, and an instruction stored on the memory and operable on the processor, wherein the processor, when running the instruction, is configured to:

acquire secondary network access capability information of a terminal device, wherein the secondary network access capability information is used to indicate a capability for the terminal device to access a secondary access network device;

control the communication interface to send a secondary connection addition request message to a first secondary access network device, wherein the secondary connection addition request message is used to request addition of the first secondary access network device as a network device for transmitting data, and the secondary connection addition request message comprises the secondary network access capability information; and control the communication interface to receive a confirmation message of the secondary connection addition request message sent by the first secondary access network device, wherein the confirmation message of the secondary connection addition request message comprises first configuration information, and the first configuration information is used to establish the secondary connection between the first secondary access network device and the terminal device;

wherein the processor is configured to:

control the communication interface to receive a first message sent by the terminal device, wherein the first message is used to indicate that a configuration between the terminal device and the first secondary access network device is valid, and the first message comprises the secondary network access capability information; and acquire the secondary network access capability information from the first message.

8. The apparatus according to claim 7, wherein the secondary connection addition request message further comprises second configuration information, wherein the second configuration information is configuration information of the secondary connection that has been established by the terminal device.

9. The apparatus according to claim 7, wherein the secondary network access capability information is used to indicate the maximum capability for the terminal device to access the secondary access network device; or the secondary network access capability information is used to indicate a capability for the terminal device to access a to-be-added secondary access network device, wherein the to-be-added secondary access network device comprises the first secondary access network device.

10. The apparatus according to claim 7, wherein the processor is further configured to:

control the communication interface to receive measurement result information of at least one secondary access network device sent by the terminal device, wherein the measurement result information is used to indicate a link quality between a respective secondary access network device and the terminal device; and determine the first secondary access network device according to measurement result information of each of the at least one secondary access network device.

11. The apparatus according to claim 7, wherein the processor is further configured to:
  control the communication interface to send the first configuration information to the terminal device so that the terminal device establishes the secondary connection with the first secondary access network device according to the first configuration information.

12. The apparatus according to claim 7, wherein the apparatus is a network device in a first communication system, and the secondary access network device is a network device in a second communication system.

13. An apparatus for establishing a secondary connection, comprising:
  a memory, a processor, a communication interface, and an instruction stored on the memory and operable on the processor,
  wherein the processor, when running the instruction, is configured to:
  control the communication interface to receive a secondary connection addition request message sent by a primary access network device, wherein the secondary connection addition request message is used to request addition of the first secondary access network device as a network device for transmitting data, and the secondary connection addition request message comprises secondary network access capability information, wherein the secondary network access capability information is used to indicate a capability for a terminal device to access a secondary access network device;
  generate first configuration information according to the secondary network access capability information, wherein the first configuration information is used to establish the secondary connection between the first secondary access network device and the terminal device; and
  control the communication interface to send a confirmation message of the secondary connection addition request message to the primary access network device, wherein the confirmation message of the secondary connection addition request message comprises the first configuration information;
  wherein the secondary network access capability information is comprised in a first message sent by the terminal device to the primary access network device, the first message is used to indicate that a configuration between the terminal device and the first secondary access network device is valid.

14. The apparatus according to claim 13, wherein the secondary network access capability information is used to indicate the maximum capability for the terminal device to access the secondary access network device, the secondary connection addition request message further comprises second configuration information which is configuration information of the secondary connection that has been established by the terminal device, and the processor is configured to:
  generate the first configuration information according to the secondary network access capability information and the second configuration information, wherein a sum of configurations corresponding to the first configuration information and the second configuration information does not exceed the capability for the terminal device to access the secondary access network device indicated by the secondary network access capability information.

15. The apparatus according to claim 13, wherein the secondary network access capability information is used to indicate a capability for the terminal device to access a to-be-added secondary access network device, wherein the to-be-added secondary access network device comprises the first secondary access network device.

16. The apparatus according to claim 13, wherein the primary access network device is a network device in a first communication system, and the apparatus is a network device in a second communication system.

* * * * *